(12) United States Patent
Kroth et al.

(10) Patent No.: US 8,699,394 B2
(45) Date of Patent: Apr. 15, 2014

(54) METHOD AND RADIO COMMUNICATION SYSTEM FOR THE TRANSMISSION OF USEFUL INFORMATION AS A SERVICE TO SEVERAL USER STATIONS

(75) Inventors: Norbert Kroth, Potsdam (DE); David Randall, Romsey (GB); Jörg Schniedenharn, Bonn (DE); Alexander Vesely, Wien (AT)

(73) Assignee: Siemens Aktiengellschaft, Munich (DE)

( * ) Notice: Subject to any disclaimer, the term of this patent is extended or adjusted under 35 U.S.C. 154(b) by 1718 days.

(21) Appl. No.: 10/528,565

(22) PCT Filed: Aug. 18, 2003

(86) PCT No.: PCT/EP03/09138
§ 371 (c)(1),
(2), (4) Date: Nov. 4, 2005

(87) PCT Pub. No.: WO2004/030385
PCT Pub. Date: Apr. 8, 2004

(65) Prior Publication Data
US 2006/0142019 A1    Jun. 29, 2006

(30) Foreign Application Priority Data
Sep. 19, 2002   (EP) .................................. 02256497

(51) Int. Cl.
*H04H 20/71* (2008.01)
(52) U.S. Cl.
USPC ...... 370/312; 370/328; 455/412.2; 455/414.3

(58) Field of Classification Search
USPC ............ 455/414.1–414.3, 560, 466; 370/328, 370/312
See application file for complete search history.

(56) References Cited

U.S. PATENT DOCUMENTS 5,559,804 A * 9/1996 Amada et al. ................. 370/347
6,463,295 B1 * 10/2002 Yun ............................... 455/522
6,633,765 B1 * 10/2003 Maggenti ...................... 455/503

FOREIGN PATENT DOCUMENTS

DE         100 64 107 A1    6/2002
WO       WO 02/19741 A2    3/2002

OTHER PUBLICATIONS

ETSI TS 122 146 V5.2.0 (Mar. 2002) XP-002208067 Universal Mobile Telecommunications System (UMTS); Multimedia Broadcast/Multicast Searvice (MBMS); Stage 1 (3GPP TS 22.146 version 5.2.0 Release 5).

* cited by examiner

Primary Examiner — Marcos Torres
(74) Attorney, Agent, or Firm — Staas & Halsey LLP

(57) ABSTRACT

A method and radio communication system for the transmit useful information as a service to several user stations with at least one radio network controller, at least one base station and at least one user station. The radio network controller is connected to an access device in a core network. The useful information is provided to several users as a service, whereby the user stations of the users are informed before the transmission of the useful information. According to the invention, the notification for the user stations of the users at least partly comprises a request for a response and the transmission of the useful information at least partly occurs after receipt of the response.

16 Claims, 1 Drawing Sheet

METHOD AND RADIO COMMUNICATION SYSTEM FOR THE TRANSMISSION OF USEFUL INFORMATION AS A SERVICE TO SEVERAL USER STATIONS

CROSS REFERENCE TO RELATED APPLICATIONS

This application is based on and hereby claims priority to PCT Application No. PCT/EP2003/009138 filed Aug. 18, 2003 and European Application No. 02256497.5 filed Sep. 19, 2002, the contents of which are hereby incorporated by reference.

BACKGROUND OF THE INVENTION

The invention relates to a method for transmitting payload information in a radio communication system having at least one radio network controller, at least one base station and at least one subscriber station.

The invention also relates to a radio communication system.

Communication systems are becoming increasingly important. Significant efforts are being made to link cable-based communication systems to radio communication systems. The resulting hybrid communication systems generate an increase in the number of available services, but also allow greater flexibility in terms of communication. At the same time, devices are being developed which can use various systems (multi-homing).

Considerable importance is attached to the radio communication systems due to the subscriber mobility which is made possible.

In radio communication systems, information (e.g. voice, image information, video information, SMS [Short Message Service] or other data) is transmitted with the aid of electromagnetic waves via a radio interface between sending and receiving station (base station or subscriber station). In this case, the emission of the electromagnetic waves takes place using carrier frequencies which lie in the frequency band which is provided for the relevant system.

Frequencies of 900, 1800 and 1900 MHz are used for the GSM (Global System for Mobile Communication) mobile radio system that has been implemented. These systems essentially transfer voice, fax and SMS (Short Message Service) short messages, as well as digital data.

Frequencies in the frequency band of approx. 2000 MHz are provided for future mobile radio systems using CDMA or TD/CDMA transmission methods, e.g. UMTS (Universal Mobile Telecommunication System) or other third-generation systems. These third-generation systems are developed with the aims of worldwide radio coverage, a large offering of services for data transmission and, most importantly, flexible management of the capacity of the radio interface, which is the interface with the fewest resources in radio communication systems. In the context of these radio communication systems, the flexible management of the radio interface should primarily allow a subscriber station to send and/or receive a large amount of data at high data speed as required.

The access of stations to the shared radio resources of the transmission medium, e.g. time, frequency, throughput or space, is governed by multiple access (MA) methods in these radio communication systems.

In the case of time division multiple access (TDMA) methods, each send and receive frequency band is divided into time slots, wherein one or more cyclically repeated time slots are assigned to the stations. Using TDMA, the radio resource of time is separated in a station-specific manner.

In the case of frequency division multiple access (FDMA) methods, the whole frequency band is divided into narrow-band portions, wherein one or more narrow-band frequency bands are assigned to the stations. Using FDMA, the radio resource of frequency is separated in a station-specific manner.

In the case of code division multiple access (CDMA) methods, the throughput/information which has to be transmitted is encoded in a station-specific manner by a scrambling code which includes of a multiplicity of individual so-called chips, whereby the throughput which must be transmitted is scrambled randomly over a wide frequency range in accordance with a code. The scrambling codes which are used by different stations within a cell/base station are mutually orthogonal or essentially orthogonal in each case, whereby a receiver recognizes the signal throughput which is intended for the receiver and suppresses other signals. Using CDMA, the radio resource of throughput is separated in a station-specific manner by scrambling codes.

In the case of orthogonal frequency multiple access methods (OFDM), the data is transferred in a broadband manner, wherein the frequency band is divided into equidistant orthogonal subcarriers, such that the simultaneous phase shifting of the subcarriers covers a two-dimensional data flow in the time-frequency range. Using OFDM, the radio resource of frequency is separated in a station-specific manner by orthogonal subcarriers. The combined data symbols which are transferred on the orthogonal subcarriers during a time unit are called OFDM symbols.

The multiple access methods can be combined. In this way, a multiplicity of radio communication systems use a combination of the TDMA and FDMA methods, wherein each narrow-band frequency band is divided into time slots.

For the purpose of the aforementioned UMTS mobile radio system, a distinction is made between a so-called FDD (frequency division duplex) mode and a TDD (time division duplex) mode. In particular, the TDD mode is characterized in that a shared frequency band is used for the signal transmission in both uplink (UL) direction and in downlink (DL) direction, while the FDD mode uses a different frequency band for the two transmission directions in each case.

In radio communication connections of the second and/or third generation, information can be transmitted in a circuit-switched (CS) or packet-switched (PS) manner.

The connection between the base station, of which there is at least one, and the subscriber station, of which there is at least one, takes place via a radio communication interface. The base station can support a plurality of radio cells in this case.

The base station, of which there is at least one, and a radio network controller (RNC) are usually components of a base station subsystem (RNS radio network subsystem). A radio communication system normally includes a plurality of base station subsystems which are connected to a core network (CN). The radio network controller of the base station subsystem is connected to an access facility (SGSN Serving GPRS Support Node) of the core network in this case.

In addition to individual items of payload information, radio communication systems transmit data which is made available to a plurality of users. Such items of payload information include, for example, video streams or other items of broadcast and/or multicast information. The services for transmitting items of payload information which are not merely intended individually for a single subscriber, but are made available to a plurality of subscribers, are grouped under the term MBMS (Multimedia Broadcast/Multicast Service). Different MBMS (Multimedia Broadcast/Multicast Service) services are usually provided as separate data streams by the core network.

WO 02/19741 A2 discloses a communication system in which an IP multicast is sent to a plurality of devices in an IP network. In order to ensure that, on the network side, there is information about which end devices wish to receive which IP multicast, an "end device membership query" is periodically sent to the end devices from the network side. Upon receipt of a membership query, an end device sends a membership report as a reply to a local router and, in the membership report, identifies those multicast groups which this end device wishes to receive.

3GPP (3rd Generation Partnership Project) TS 22.146 V5.2.0 Release 5 describes the requirements which must be supported by a 3GPP system (UTRAN [Universal Terrestrial Radio Access Network] and GERAN [GSM EDGE Radio Access Network]), in order to provide broadcast and multicast services (EDGE: Enhanced Data rates for GSM Evolution).

Before the items of payload information are made available as a service to a plurality of subscribers, a notification takes place in relation to the subscriber stations of those subscribers who want to use the service, before the actual transmission of the items of payload information of the service. This notification of the subscriber stations is necessary so that the receivers can be configured. Depending on the mode of the subscriber stations (e.g. "connected mode" or "idle mode"), they are notified by a "notification" or "paging", for example. Group-specific mechanisms are normally used for notification, wherein a plurality of subscriber stations are addressed simultaneously.

The transmission of items of broadcast/multicast information as services should take place advantageously. In particular, any avoidable utilization of radio resources should be avoided whenever possible.

SUMMARY OF THE INVENTION

One aspect of the invention may therefore address the problem of setting forth a method and a radio communication system of the type cited at the beginning, which satisfy these specifications.

The inventors propose that the notification to the subscriber stations of the subscribers includes in at least some cases a request for a reply, and the transmission of the payload information takes place in at least some cases following receipt of the reply.

The method assumes that usually the subscriber stations of subscribers who use MBMS services are not uniformly distributed in the radio network. In most cases, therefore, there will also be areas in the radio network where transmission of the payload information of the MBMS services is unnecessary because no receiving subscribers are present there. Therefore, if no reply is received on the network side in response to a request for a reply within the context of a notification to the subscriber stations of the subscribers of an MBMS service, the transmission of the payload information does not take place in at least some cases. In this way, radio resources are not occupied unnecessarily.

The method and system take advantage of the fact that subscriber stations of the subscribers who use the MBMS service need not be present in all radio cells of the radio communication system. In principle, therefore, it is possible to avoid any unnecessary transmission of payload information in the radio cells or sectors of radio cells where a request to the subscriber stations was not followed by a corresponding reply.

The subscriber stations are advantageously grouped into groups with regard to the notification. In particular, an identical notification can be sent to a group of subscriber stations of the subscribers. Due to the radio network architecture which is already present, it is particularly beneficial if the grouping of the subscriber stations takes place with reference to their assignment to radio cells. It is then particularly easy to incorporate the method into existing systems.

The notification to the subscriber stations of the subscribers—as explained above—includes a request for a reply in at least some cases, i.e. at least some subscriber stations or at least one or more groups of subscriber stations receive a request for a reply. In this case, a configuration provides for the notification to the subscriber stations of the subscribers to include either a request for a reply or an information item indicating that no reply is necessary, wherein the transmission of the payload information takes place independently of a reply in the latter case.

In this type of configuration, for example, a request for a reply might be omitted in radio cells which supply a hotspot, because it is very probable that, due to e.g. the high density or large number of subscriber stations, at least one of the subscribers who use the offered MBMS service will be present. By virtue of the fact that no request for a reply is sent in this case, not only radio resources are saved, but also unnecessary delays in the transmission of MBMS services can be avoided. It is possible effectively to avoid overload situations in the case of access to shared resources in the uplink, e.g. if a large number of subscribers using MBMS services are in a radio cell, which overload situations would otherwise occur if a reply was requested from a very large number of subscribers.

The subscriber stations or the groups of subscriber stations are informed, by a corresponding information field in the notification, whether they are expected to send a reply or not. The request for a reply (RESP) or the information indicating that no reply is necessary can be transmitted in the form of a bit (e.g. "response" bit).

In a development, at least one decision criterion is used to establish whether a notification including a request for a reply or including the information that no reply is necessary is transmitted from the radio network controller to the groups of subscriber stations of the subscribers. This is preferably established in the radio network controller in this case.

A static and/or dynamic decision criterion can be used in principle, but it must be a radio network-specific decision criterion. The decision whether a notification is to include a request for a reply or the information that no reply is necessary can be adapted according to the static and dynamic conditions e.g. in a radio cell.

The decision criterion can take into consideration, for example, the configuration of the radio network, existing knowledge on the radio network side about subscribers, the utilization of the radio resources (e.g. a large number of subscribers who use the shared resource in the uplink) in the radio network or in areas thereof, specific properties of the service (e.g. frequency and duration of the transmission), or a combination of the aforementioned possibilities. In this context, information about the configuration can be supplied by the operations and maintenance center (OMC), for example.

In a development, the replies of the subscriber stations of the subscribers from whom a reply has been requested, and in particular the replies of the subscriber stations within a group of subscriber stations, are not transmitted concurrently. This measure also contributes effectively to a temporally distributed use of radio resources.

The replies of the subscriber stations of the subscribers from whom a reply has been requested, and in particular the replies of the subscriber stations of a group, can be transmitted at random or preferably in a controlled manner with regard to the time of transmission.

The transmission of payload information for a group can advantageously take place following receipt of the reply of at least one subscriber station of the group. This prevents delays and also saves radio resources. For in the context of the request for time-staggered replies from the subscribers, those subscriber stations wanting to transmit their reply after the receipt of a reply from a first subscriber station can be informed, for example as part of the start of the transmission of the payload information of the service or as a result of the start of the transmission of the payload information of the service, that a reply is no longer necessary.

The radio communication system provides that the notification to the subscriber stations of the subscribers includes a request for a reply in at least some cases, and such that the transmission of the payload information takes place following receipt of the reply in at least some cases.

The radio communication system can provide that a notification is sent to groups of subscriber stations of the subscribers.

On the basis of at least one decision criterion, a decision may be made regarding whether a notification including a request for a reply or including the information that no reply is necessary is transmitted from the radio network controller to a group of subscriber stations of the subscribers. The mechanism for making this decision is preferably situated in the radio network controller (RNC). The radio network controller is then expanded to include a function which analyzes whether, e.g. on the basis of the specific configuration of a radio cell, a reply should be requested or not.

The described radio communication system is particularly suitable for carrying out the method. Corresponding units and entities can be present in the radio communication system or its individual components in each case for carrying out the method and its configurations and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
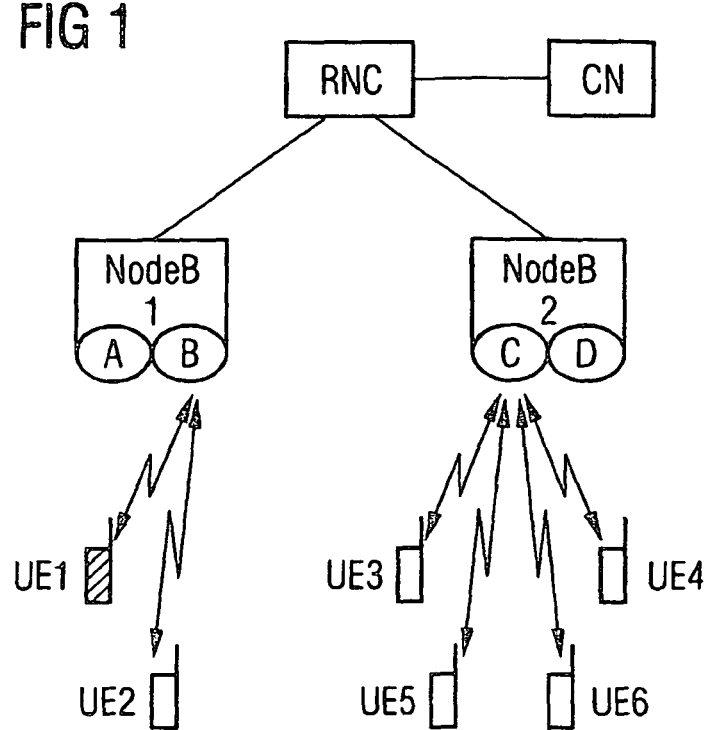
FIG. 1 shows a schematic illustration of a radio communication system according to the invention.

Reference will now be made in detail to the preferred embodiments of the present invention, examples of which are illustrated in the accompanying drawings, wherein like reference numerals refer to like elements throughout.

FIG. 1 shows a schematic illustration of a radio communication network for a transmission between a radio network controller RNC, two base stations NodeB1 and NodeB2, and mobile subscriber stations UE1, UE2, UE3, UE4, UE5 and UE6.

The radio network controller RNC is connected on one side to an access facility of a core network CN and on the other side to the two base stations NodeB1 and NodeB2. Base station NodeB1 serves the radio cells A and B and base station NodeB2 serves the radio cells C and D. The subscriber stations UE1 and UE2 are situated in the radio cell B. The subscriber stations UE3, UE4, UE5 and UE6 are assigned to the radio cell C.

In the radio cell B of the base station NodeB1, the mobile subscriber station UE2 is to receive an MBMS service which can be signaled via a group control channel, for example, by the radio network controller RNC via the radio cell B using the radio communications interface. The notification in the radio cell B includes a request for a reply. Subscriber station UE1 is not currently interested in using an MBMS service. After the subscriber station UE2 has responded to the request in the notification by sending off a reply, the transmission of the payload information of the service begins in the radio cell B. In this case, the payload information of the service is transmitted over a traffic channel, for example.

Provision is likewise made to transmit an MBMS service in the radio cell C. Radio cell C supplies a potential hotspot, for example. On the basis of this knowledge, the radio network controller RNC dispenses with a request for a reply within the radio cell C, since a larger number of users is anticipated for the MBMS service here. In radio cell C, therefore, payload information of the MBMS service is transmitted without delay to the base station NodeB2 via the radio communications interface and by the mobile subscriber stations UE3, UE4, UE5 and UE6. In the case which is shown here, the subscriber stations are grouped on the basis of their assignment to the radio cells.

No subscriber stations are shown in the radio cells A and D.

Figure 2:
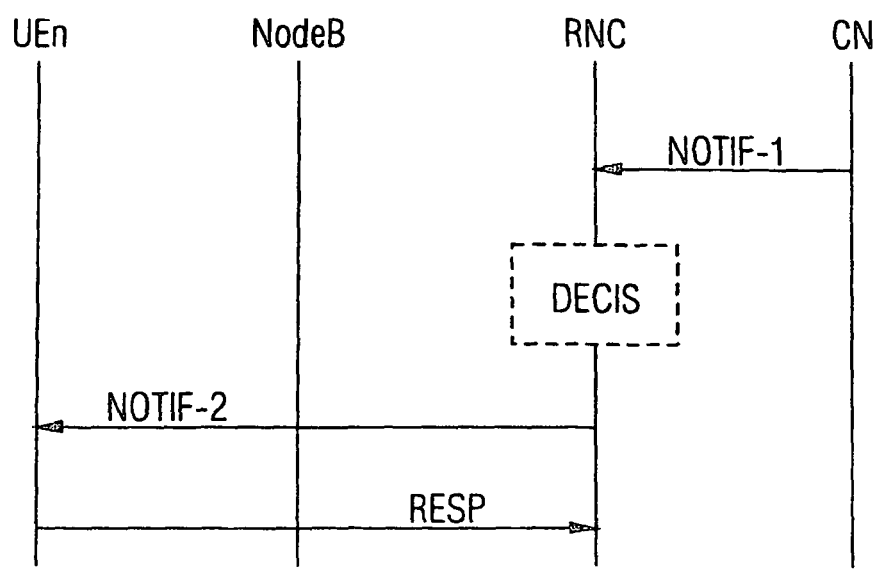
FIG. 2 shows a schematic illustration of a flow diagram for the transmission, according to one potential embodiment of the invention, between core network, radio network controller, base station and subscriber station.

FIG. 2 shows a schematic illustration of a flow diagram for the transmission between core network CN, radio network controller RNC, base station NodeB and subscriber stations UEn.

The radio network controller RNC receives the message NOTIF-1 via an access facility of the core network CN, the message indicating that payload information of an MBMS service should be made available to subscriber stations UEn.

With reference to the exemplary embodiment which is described in connection with FIG. 1, the MBMS service is to be made accessible to e.g. the subscriber station UE2 in the radio cell B of the NodeB1 and to the subscriber stations UE3, UE4, UE5 and UE6 in the radio cell C of the NodeB2 from FIG. 1. In this case, the radio network controller RNC makes the decision DECIS that the notification NOTIF-2 to the subscriber station UE2 contains a request for a reply RESP, and that the notification NOTIF-2 to the subscriber stations UE3 to UE6 includes an information item indicating that no reply is necessary. In the radio cell B of the base station NodeB1, a transmission of the payload information of the MBMS service then takes place following receipt of the reply RESP. In the radio cell C of the base station NodeB2, the transmission of the payload information takes place independently of a reply RESP.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A method for transmitting payload information using a multimedia broadcast multicast service in a radio communication system having a radio network controller, a base station and subscriber stations, with the base station being connected to the subscriber stations via a radio communication interface, the method comprising:
    connecting the radio network controller to an access facility of a core network and to the base station;
    making the payload information available as a service to the subscriber stations, the payload information being made available from the access network, via the radio network controller and the base station;
    sending a request notification to at least some of the subscriber stations, the request notification announcing that a transmission of the payload information is pending, such that the subscriber stations may be configured for receiving the payload information, the request notification including an information field that indicates whether or not a reply to the request notification should be sent by the subscriber stations before the payload information is transmitted to the subscribers stations, the indication in the information field as to whether or not a reply is needed being independently determined for each radio cell included in the radio communication system; and
    transmitting, when the reply is requested, the payload information to subscriber stations from which a reply was received or transmitting the payload information to the subscriber stations from which no reply was requested.

2. The method as claimed in claim 1, wherein
the radio network controller makes a decision regarding which subscriber stations are to receive the request notification.

3. The method as claimed in claim 1 wherein
a decision is made regarding which subscriber stations are to receive the request notification, and
the decision is based on criterion specific to the radio network of the radio communication system.

4. The method as claimed in claim 1 wherein
a decision is made regarding which subscriber stations are to receive the request notification, and
the decision takes into consideration at least one factor selected from the group consisting of configuration of the radio network of the radio communication system, existing knowledge on a radio network side about subscribers, utilization of radio resources in the radio network, utilization of radio resources in areas of the radio network, and specific properties of the service.

5. The method as claimed in claim 1, wherein the request notification is used to configure the subscriber stations for the payload information.

6. The method as claimed in claim 1, wherein, when a radio cell in the radio communication system contains a hot spot, the information field indicates that a reply to the request notification is not required to be sent by the subscriber stations in the radio cell containing the hot spot before the payload information is transmitted to the subscribers stations in the radio cell containing the hot spot.

7. The method as claimed in claim 1, wherein, when a reply to the request notification is required for a specific radio cell and there is no subscriber station in the specific radio cell that has replied, the payload information is not transmitted to any of the subscribers stations in the specific radio cell, and when no reply to the request notification is required, the payload information is transmitted to the subscriber stations.

8. The method as claimed in claim 1, wherein
the request notification is not sent to all subscriber stations.

9. The method as claimed in claim 8, wherein
the request notification is sent to subscriber stations selected based on the subscriber stations assignment to radio cells.

10. The method as claimed in claim 8 wherein
transmission of the payload information for a group of subscriber stations takes place following receipt of the reply from one subscriber station of the group.

11. The method as claimed in claim 1 wherein
replies from the subscriber stations are not transmitted concurrently.

12. The method as claimed in claim 11 wherein
replies from the subscriber stations are transmitted at random.

13. The method as claimed in claim 11 wherein
replies from the subscriber stations are transmitted in a controlled manner with regard to time of sending the request notification.

14. A radio communication system for transmitting payload information using a multimedia broadcast multicast service as a service to a plurality of subscriber stations, comprising:
    a radio network controller connected to an access facility of a core network;
    a base station connected to the radio network controller;
    subscriber stations connected to the base station via a radio communication interface;
    a supply unit to make the payload information available as a service to a plurality of subscriber stations;
    a request unit to send a request notification to at least some of the subscriber stations, the request notification the request notification announcing that a transmission of the payload information is pending, such that the subscriber stations may be configured for receiving the payload information, the request notification including an information field that indicates whether or not a reply to the request notification should be sent by the subscriber stations before the payload information is transmitted to the subscriber stations, the indication in the information field as to whether or not a reply is needed being independently determined for each radio cell included in the radio communication system; and
    a transmit unit to transmit, when the reply is requested, the payload information to subscriber stations from which a reply was received or to transmit the payload information to the subscriber stations from which no reply was requested.

15. The radio communication system as claimed in claim 14, wherein
the request notification is not sent to all subscriber stations.

16. A method for transmitting payload information using a multimedia broadcast multicast service in a radio communication system having a base station connected to subscriber stations via a radio communication interface, the method comprising:
    making the payload information available as a service to the subscriber stations, the payload information being made available via the base station;
    sending a request notification to at least some of the subscriber stations, the request notification the request notification announcing that a transmission of the payload information is pending, such that the subscriber stations may be configured for receiving the payload information, the request notification including an information field that indicates whether or not a reply to the request notification should be sent by the subscriber stations before the payload information is transmitted to the subscriber stations, the indication in the information field as to whether or not a reply is needed being independently determined for each radio cell included in the radio communication system; and transmitting, when the reply is requested, the payload information to subscriber stations from which a reply was received or transmitting the payload information to the subscriber stations from which no reply was requested.

\* \* \* \* \*

UNITED STATES PATENT AND TRADEMARK OFFICE
CERTIFICATE OF CORRECTION

| | |
|---|---|
| PATENT NO. | : 8,699,394 B2 |
| APPLICATION NO. | : 10/528565 |
| DATED | : April 15, 2014 |
| INVENTOR(S) | : Kroth et al. |

It is certified that error appears in the above-identified patent and that said Letters Patent is hereby corrected as shown below:

On the Title Page Item [73] (Assignee), Line 1, delete "Aktiengellschaft," and insert
-- Aktiengesellschaft, --, therefor.
On the Title Page Item [56] (OTHER PUBLICATIONS), Line 3, delete "Searvice" and insert
-- Service --, therefor.

In the Claims

Column 8, Lines 36-37, in Claim 14, delete "the request notification the request notification" and insert -- the request notification --, therefor.
Column 8, Lines 65-66, in Claim 16, delete "the request notification the request notification" and insert -- the request notification --, therefor.

Signed and Sealed this
Twenty-second Day of July, 2014

Michelle K. Lee
*Deputy Director of the United States Patent and Trademark Office*